United States Patent [19]
Allinger et al.

[11] 3,778,631
[45] Dec. 11, 1973

[54] METHOD AND APPARATUS FOR OPTICALLY DETECTING DEFECTS IN SPECULAR WEBS

[75] Inventors: Hubert B. Allinger; Harry L. Edwards, both of Rochester, N.Y.

[73] Assignee: Eastman Kodak Company, Rochester, N.Y.

[22] Filed: May 8, 1972

[21] Appl. No.: 251,442

[52] U.S. Cl............250/572, 356/121, 250/227
[51] Int. Cl. .......................................... G01n 21/30
[58] Field of Search...................... 250/219 DF, 227; 356/209, 210, 200, 121

[56] References Cited
UNITED STATES PATENTS

| | | | |
|---|---|---|---|
| 3,105,152 | 9/1963 | Nash | 356/200 |
| 2,812,447 | 11/1957 | MacMartin et al. | 250/219 DF |
| 3,330,961 | 7/1967 | Juengst et al. | 356/200 |
| 2,395,482 | 2/1946 | Hurley | 250/219 DF |
| 3,360,651 | 12/1967 | Linderman | 356/200 |

*Primary Examiner*—Harold A. Dixon
*Attorney*—W. T. French et al.

[57] ABSTRACT

Webs of reflecting material are inspected for defects by directing upon the web surface a beam of light having a radiating pattern substantially of the type produced by an ideal point light source. The rays, which spread outwardly from the light source, are redirected by the reflecting web to continue on to a receiving device for monitoring. Light reflected from a defect-free portion of the web presents at the receiving device a uniform pattern having no abrupt changes in intensity, while rays reflected from a defect deviate from the said uniform pattern, the nature of the deviation being related to the type of defect. Because of the spreading characteristic of the rays, the pattern deviations enlarge as the rays travel to the receiving device, and consequently they present a readily detectable defect indication even when produced by small defects. Hence, enlarged indication of defects is achieved without requiring lenses, thereby avoiding the depth of field, alignment, and dust accumulation considerations which lenses present. The receiving devices may rely on visual monitoring or monitoring achieved through sensing devices.

3 Claims, 7 Drawing Figures

PATENTED DEC 11 1973 3,778,631

METHOD AND APPARATUS FOR OPTICALLY DETECTING DEFECTS IN SPECULAR WEBS

BACKGROUND OF THE INVENTION

1. Field of the Invention

The present invention relates to the inspection of webs, and more particularly to the inspection of specular webs for defects through the use of light radiation.

2. Description of the Prior Art

High-speed web forming or coating machines have numerous uses in industry. However, such high-speed machines present a serious quality control problem requiring constant monitoring of the outgoing product to avoid waste of valuable input materials and to prevent imperfect product from reaching the consumer. As might be expected, considerable effort has been directed toward the development of devices for detecting defects in moving webs.

A particularly acute inspection problem exists in the production of webs requiring smooth surfaces free of even very small defects, for example, products such as photographic film. For such products, stringent requirements as to sensitivity are placed upon the inspection method and device, it being necessary to detect readily defects barely (if at all) visible to the eye. Moreover, to be suitable for highly automated production, the inspection device must be reliable and require very little servicing or adjustment.

The prior art devices which have proved satisfactory under the foregoing requirements rely on light radiation for defect detection. For convenience, these prior art devices may be treated separately according to whether or not a lens is used in the inspection system.

Where lenses are used in inspection systems, they commonly serve either to magnify the image formed by rays leaving the web surface, or to focus the beam from the light source, usually into a narrow band which is directed onto the web surface. Magnifying lenses are typically used in devices which rely on changes in reflectivity for detection and are particularly successful where small contrasting specks are to be detected on uniform diffuse surfaces. Quite a different situation is presented, however, when inspecting substantially specular surfaces. Here a magnifying lens tends to yield a display presenting an overall glare without sharp points of contrast to serve as readily recognizable indications of defects. Thus, devices using magnifying lenses are not well suited to inspection of substantially specular products such as film.

The focused beam approach to optical web defect detection utilizes a lens to focus a light beam onto the web for reflection therefrom at a preselected angle. A device of this type is disclosed in U.S. Pat. No. 3,206,606 to P. A. Burgo et al. With focused beam inspection methods and devices, alignment is critical, both for the oncoming rays striking the web and for the ray receiver intercepting the reflected rays, as the defect detection relies on sensing dislocations along the narrow beam caused by rays encountering defects. As a consequence of the requirement for accurate alignment, a moderate change in the thickness of the web being processed can necessitate realignment of the inspection device. Further, the focused beam approach requires a costly lens assembly, particularly where a wide web is to be inspected.

A further problem presented by lens devices in general is that of keeping optical surfaces clean to prevent false indications which might be caused by dust accumulations. The cleaning problem is aggravated in typical web inspection environments, as moving webs tend to generate static electrical charges which, in turn, tend to attract dust particles.

The other type of prior art optical inspection device, those which do not use lenses, typically utilize diffuse light and monitor it either visually or with light sensors. One example of an inspection device of the lenseless type is shown in U.S. Pat. No. 3,515,883 to Kiroo Akamatsu et al. Devices of the lensless type typically rely on differences in reflectivity for detection of defects and, like the magnifying lens type devices, are most effective on surfaces which are non-specular, since the defects on specular surfaces do not present sufficient contrast to be readily distinguishable. Furthermore, prior art lensless devices do not magnify the defect indication and are accordingly limited in sensitivity by the capabilities of the human eye or of such light sensors as might be used for detection. Thus, prior art lensless devices are poorly suited to inspection of substantially specular webs for detection of small defects.

From the foregoing, it will be appreciated that a need exists for an inspection device, for detecting small defects on substantially specular webs, which provides an enlarged and distinct indication of defects, while eliminating disadvantages, such as the need for precise alignment or for adjustment of alignment for minor changes in the product under process. Accordingly, a desirable inspection method and apparatus would incorporate the simplicity, reliability, and reduced servicing requirements of a basic lensless inspection system with the sensitivity achievable through the use of lenses.

SUMMARY OF THE INVENTION

Thus, it is a purpose of this invention to provide a new and improved specular web inspecting method and apparatus which overcomes the disadvantages of the prior art.

In accordance with the present invention, a substantially specular web is inspected for defects by directing upon the surface thereof light rays diverging radially from a ray source, said rays being reflected from said web surface to continue in an enlarging uniform pattern, wherein defects on the web surface so deviate the reflected light rays as to introduce irregularities into said enlarging ray pattern. Monitoring of the enlarging ray pattern for defect-caused irregularities by means of a receiving device placed in the path of the reflected rays then effectuates the detection of defects.

According to the invention, different type images indicate different type defects: For example, a dark area in a ray pattern identifies a protrusion defect, while a brightened area represents a depression defect. (An additional characteristic is the fact that a defect which destroys the specularity of a surface appears as a dark area.)

Two other characteristics of the ray pattern are as follows: (1) As in a lens-produced image, the image contains a range of light intensities and produces an image of surface texture, as well as identifying defects, and (2) The depth of field is such that an enlarged image can be projected onto a wall or ceiling without need for focusing.

There is considerable value in knowing whether a defect is a depression or protrusion. In the art of emulsion coating, different remedial measures are necessary for different types of defects. A bubble, for instance, results from gas trapped in the emulsion and appears as a very dark spot. A "gel" which results from a speck of undissolved gelatin appears as a dark area surrounded by a bright ring, since the emulsion which is piled on top of the speck leaves a depression in the surface immediately surrounding the speck. Streaks, which are very serious defects, appear as light or dark lines, depending on whether they are depressions or protrusions.

An object of the present invention is the provision of an enlarged, distinct display for indicating very tiny web defects.

The invention and its objects and advantages will become more apparent in the detailed description of the preferred embodiment presented below.

BRIEF DESCRIPTION OF THE DRAWINGS

The subject matter which is regarded as the invention is particularly pointed out and distinctly claimed in the concluding portion of this specification. The invention, however, as to its organization and operation, together with further features and advantages thereof, will best be understood by reference to the following description, taken with the accompanying drawings, in which:

DESCRIPTION OF THE PREFERRED EMBODIMENT

Referring now to the Figures, like numerals represent like elements throughout the several views.

Figure 1:
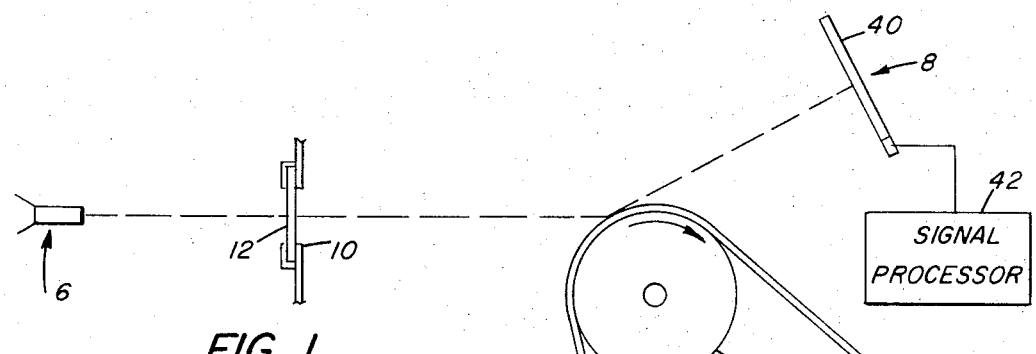
FIG. 1 is a diagram illustrating the layout of an inspection device according to the present invention.

In FIG. 1, the general layout of an inspection device according to the present invention is illustrated. The web 2 to be inspected has a surface of substantially specular character. Preferably, though not necessarily, the web 2 changes direction at the inspection area through the action of a guide roller 4. Light from a radial ray light source 6 is directed upon an inspection area which is preferably a band extending along the surface of the roller 4, transverse to the direction of web motion. While the following description will refer to a moving web, it will be understood that a stationary web or surface may be inspected in an analogous manner by effecting a scanning movement by the inspection device relative to the surface under inspection.

Rays from the light source 6 diverge as they travel to the inspection area of the web. Upon striking the inspection area, such rays are reflected and redirected in spreading fashion from the web surface; and as they spread outwardly, they illuminate a receiver 8 disposed in their path. Those rays reaching the receiver 8 compose the inspection beam, and the ray pattern therein presented after reflection contains information as to the quality of the web. The receiver 8 displays and/or monitors the ray pattern to effect detection of defects.

Web inspection, save for the source 6, is carried on in the dark: A light control means, such as baffle 10, may be included between the light source 6 and web 2 to prevent light not forming part of the operative inspection beam from illuminating the general surroundings. While not a necessary element, the baffle 10 can be helpful in preventing the washout or loss of display contrast which would result with high ambient light levels.

Where a light sensitive product, such as photographic film, is to be inspected, a filter 12 passing only light outside the frequency range of sensitivity is mounted in the path between the light source 6 and web 2 to thereby prevent damaging rays from reaching the sensitized product.

As will become more apparent, the ray pattern produced by the light source is a critical factor to the operation of the invention, and a pattern of rays tending to diverge radially so as to be substantially free of ray intersections is required. From this requirement, the source is seen to be substantially in the nature of the ideal point source hypothesized in fundamental optics.

Figure 2:
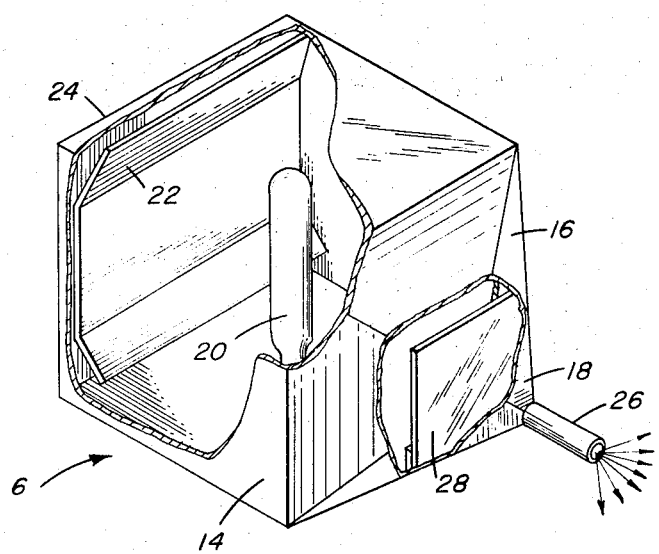
FIG. 2 is a cutaway perspective view of a presently preferred form of ray source according to the invention.

Now referring to FIG. 2, a preferred form of a radial ray light source 6 is illustrated. Light source 6 comprises a housing 14 having an output end 16 which tapers down to a vertex 18; a lamp 20, for example, a projection lamp, mounted within the housing; a reflector 22 mounted within the housing at the end 24 opposite vertex 18; and a small diameter optical fiber or light pipe 26 mounted to extend outwardly of the housing at the vertex 18 from a light receiving end located just within the housing.

The lamp 20 produces a high level of illumination within the housing 14 and the reflector 22 acts to intensify the illumination at the output end 16 of the housing. Light rays striking the receiving end of the light pipe 26 are transmitted therethrough to the opposite end thereof, hereinafter denoted the source end, and are radiated outwardly therefrom. With the foregoing device, high intensity light is caused to radiate from an area defined by the cross-section of the light pipe 26. By selecting a small cross-sectional area for the light pipe 26, the source end of the light pipe acts as a practical form of radial ray light source, approaching the ideal, albeit practically unachievable, point light source.

Where inspection of a sensitized product, such as photographic film, is intended, a modification of light source 6 is necessary to avoid damage to the product. Accordingly, a filter 28 passing only light of frequencies to which the product is insensitive may be interposed between the lamp 20 and the light pipe 26.

Figure 3:
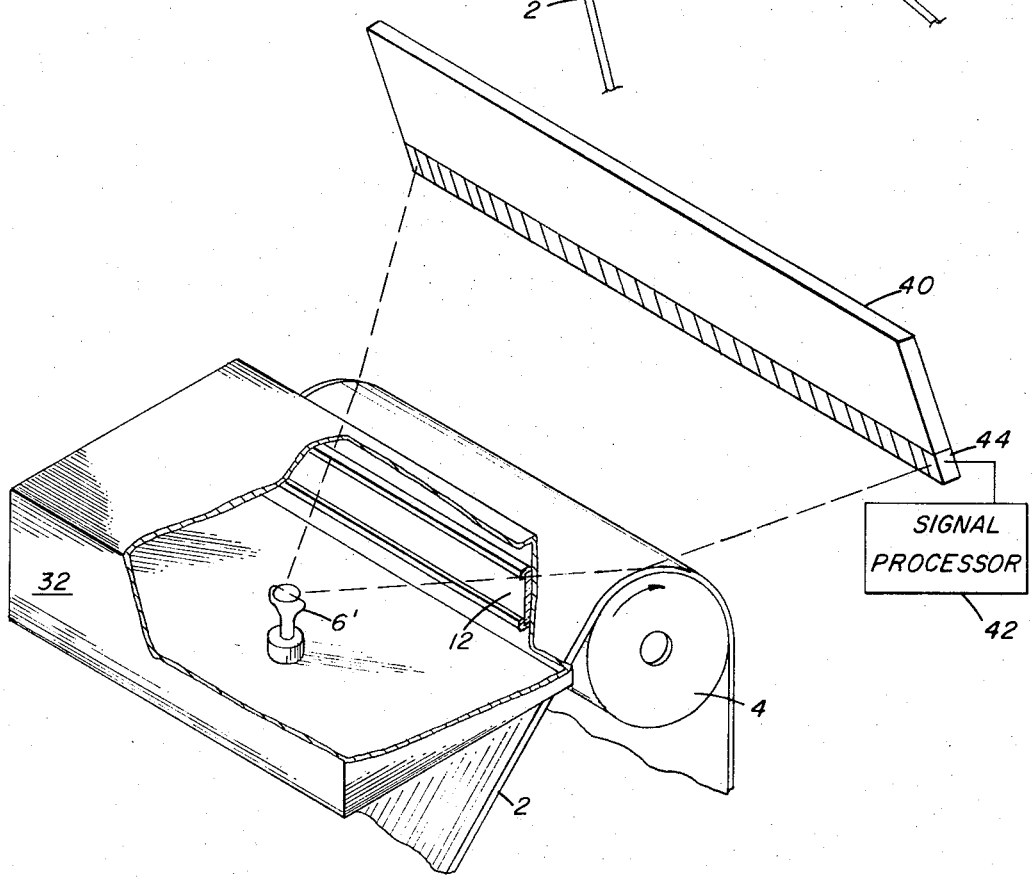
FIG. 3 is a perspective view of an inspection system according to the present invention.

A second form of a practical radial ray light source, illustrated in FIG. 3, is the xenon arc lamp 6'. Where the arc is selected of sufficiently small dimensions, such a lamp provides a ray pattern having the desired radially diverging characteristics. As shown in FIG. 3, the light source 6' is mounted in a lamp housing 32 which supports the baffle 10 and filter 12. The light source 6' preferably lies in a plane through the longitudinal centerline of the web 2 and is disposed to emit rays to an area on the web preferably at the location where the web bends around the guide roller 4. The angle at which the rays strike the web 2 is not critical, and it is thus a feature of the invention that precise alignment in relation to the web is not required.

Figure 4:
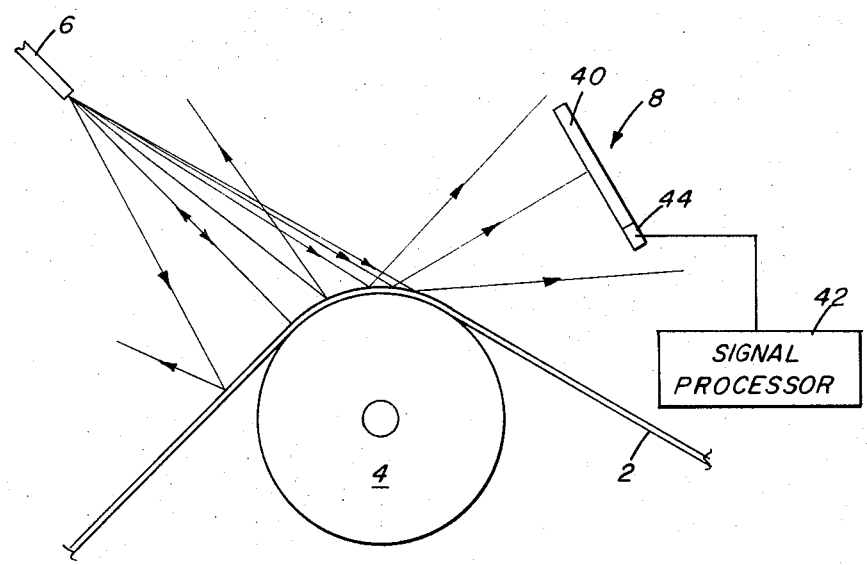
FIG. 4 is a diagrammatic illustration of the inspection ray pattern as viewed edgewise of the web.

As is represented in FIG. 4, the rays are redirected through reflection from the surface of web 2 and fan out in accordance with law of reflection, the angular spread being accentuated by the roller 4 where the web presents a convex surface to the oncoming rays.

Figure 5:
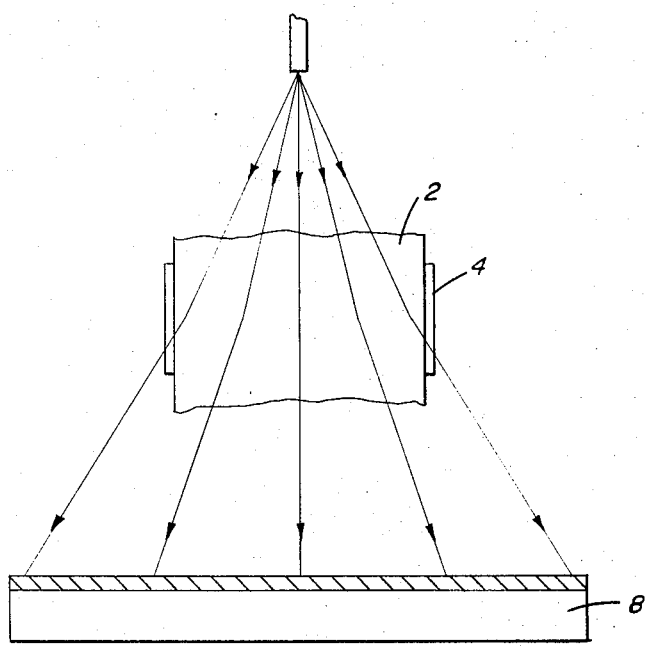
FIG. 5 is a diagrammatic illustration of the inspection ray pattern, viewed from above, for a defect-free, substantially specular web.

Referring now to FIG. 5, the ray pattern is presented as seen from above the web 2 for the condition where no defects are present in the web. So long as the source rays are spreading in a non-intersecting pattern and are reflected from a flat or convex surface with no defects, the reflected rays will present a uniform pattern having no abrupt changes in intensity, and points on a display of the pattern of reflected rays will correspond on a one-to-one basis to points on the web surface under inspection. This result derives from fact that reflection of the rays from such surfaces maintains or enhances the angular spreading of the incident rays in uniform manner and does not tend to focus them. Since no intersections occur, each point on the display contains information about a corresponding point on the web 2 under inspection. As a further consequence of the uniform ray pattern for a defect-free web portion, no discontinuities of intensity are presented in a display thereof, and this uniform display characteristic accordingly provides an indication of a defect-free web.

Figure 6:
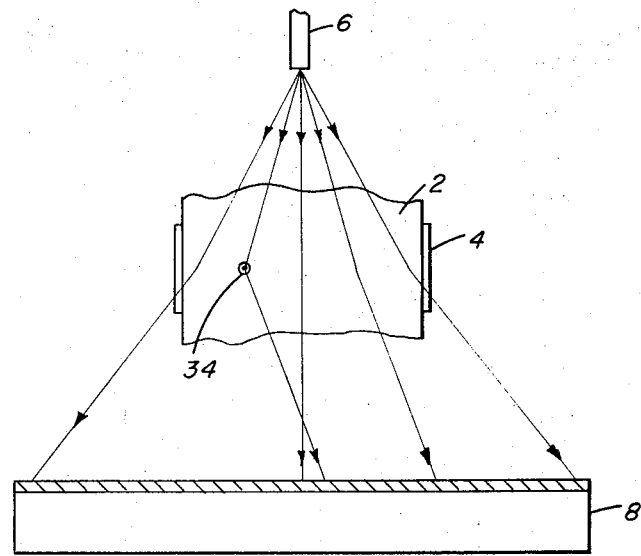
FIG. 6 is a diagrammatic illustration of the inspection ray pattern, viewed from above, for a substantially specular web having a defect.

On the other hand, referring to FIG. 6, when a defect 24 is present in the web portion reflecting the inspection beam, an irregularity of reflection is introduced. Practice has shown that nicks or depressions tend to cause a ray-focusing; that is to say nicks or depressions cause the striking rays to leave at less of an angular speed than would be the case for a smooth surface, and thus produce a bright spot in the ray pattern. Bubbles or raised areas have an opposite effect and spread the impinging rays to produce a dark spot in the ray pattern. Thus, web defects introduce irregularities into the otherwise uniform light ray pattern, and accordingly, the ray pattern is caused to contain information indicating the quality of the portion of the web 2 under inspection in the form of bright and dark spots introduced into the pattern. By monitoring the intensity pattern of the inspection beam, a detection of defects may consequently be effected.

Figure 7:
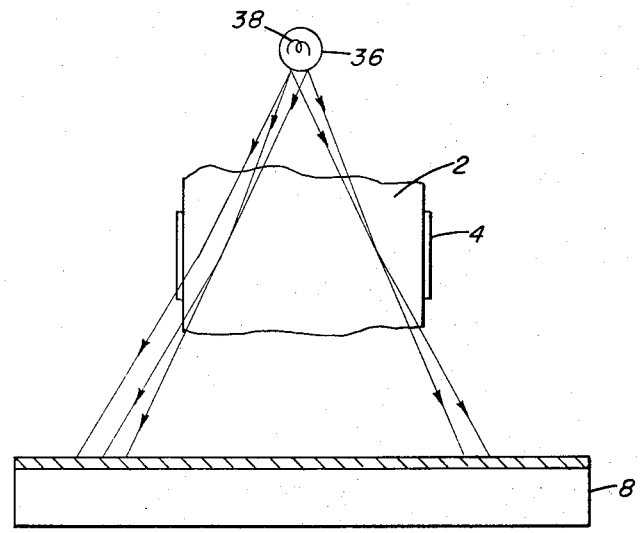
FIG. 7 is a diagrammatic illustration of the inspection ray pattern, viewed from above, for rays from an ordinary light source when reflected from a substantially specular web.

The defect indication achieved through the device of the invention is perhaps better appreciated by a comparison to a similar arrangement with an ordinary light source. Referring to FIG. 7, the nature of the ray pattern produced by an ordinary light source 36, which includes a filament 38 having relatively large dimensions, is represented in a ray diagram. Numerous ray intersections are seen to occur among rays emanating from different portions of the filament 38. Now considering the device at an instant of time, to remove the effects of web motion, it should be appreciated that ray crossovers permit adjacent points on the display of the reflected inspection beam to receive light contributions reflected from the same point on the web. Stated differently, the one-to-one correspondence between points on the web and points on the display no longer exists with increasing ray crossings. The defect information is thus merged with other light contributions and becomes practically indistinguishable.

It should also be noted that the operating principle of the invention is especially applicable for substantially specular surfaces. Non-specular surfaces destroy the ordered pattern of the inspection rays, causing light reflected from a defect to be merged with other light contributions, thereby obliterating the defect information content from the reflected ray pattern.

The receiver 8 which is best seen in FIG. 3 is disposed to intercept the inspection beam and acts to monitor the ray pattern for indications of defects. Monitoring might be accomplished, for example, visually, by means of a ground glass screen 40, or automatically by a signal processor 42 cooperating with photosensitive means, such as a series of photocells 44. Where infrared light is used for inspection, photodiodes would be satisfactory photosensitive means. The signal processor 42 might be programmed for sophisticated analysis and recording as the application requires. A satisfactory photocell receiver for use with the present invention is disclosed in U.S. Pat. No. 3,206,606 to P. A. Burgo et al.

The invention has been described in detail with particular reference to preferred embodiments thereof, but it will be understood that variations and modifications can be effected within the spirit and scope of the invention.

What is claimed is:

1. Apparatus for inspecting a substantially specular web by monitoring light ray patterns reflected from said web, comprising:
   a. a housing;
   b. a lamp within said housing;
   c. reflector means mounted at one end of said housing to intensify the illumination at the opposite end thereof;
   d. a light pipe of preselected small diameter, mounted to project through said opposite end of said housing, to receive light rays from within said housing and transmit said light rays out of said housing for transmission therefrom, which rays by their transmission in the small diameter pipe are caused to emanate from the end thereof in a radially diverging pattern that illuminates a surface of said web; and
   e. ray receiving means disposed in the path of the rays reflected from said web surface for monitoring the resulting light ray patterns to indicate the presence of irregularities in said web surface.

2. Apparatus according to claim 1 wherein said ray receiving means is a ground glass screen.

3. Apparatus according to claim 1 wherein said ray receiving means comprises photosensitive means and signal processing means coupled to a photosensitive means.

* * * * *